April 6, 1943.  W. W. CARGILL  2,315,592

LEAKPROOF DRY CELL

Filed March 15, 1940

Inventor:
William W. Cargill,
By Chritton, Wiles, Davies, Hirschl & Dawson
Attorneys Patented Apr. 6, 1943

2,315,592

UNITED STATES PATENT OFFICE 2,315,592

LEAKPROOF DRY CELL

William W. Cargill, Madison, Wis., assignor to Ray-O-Vac Company, a corporation of Wisconsin Application March 15, 1940, Serial No. 324,203

4 Claims. (Cl. 136—110)

This invention relates to electric battery cells, and more particularly to an improved leak-proof cell having a moisture-proof insulating shell made of plastic material.

The primary object of the invention is to provide an improved cell which is sealed up in a strong casing of molded or extruded plastic material to withstand great pressure and prevent chemicals from oozing out of the cell and causing damage to surrounding material such as a flashlight casing.

A further object of the invention is to provide a cell with a molded or extruded resinous plastic casing of improved appearance and utility. In using the term "resinous plastic" I mean to include such materials known as condensation products, cellulose acetate or other commercial plastics that are sold under the trade names of "Tenite," "Bakelite," and the like. The essential characteristics of the material are that they be strong, moisture-proof, and electrical insulators. The cell may be molded, or formed in an extrusion press, depending upon the material used.

The invention is illustrated in the preferred embodiment in the accompanying drawing, in which—

Figure 1:
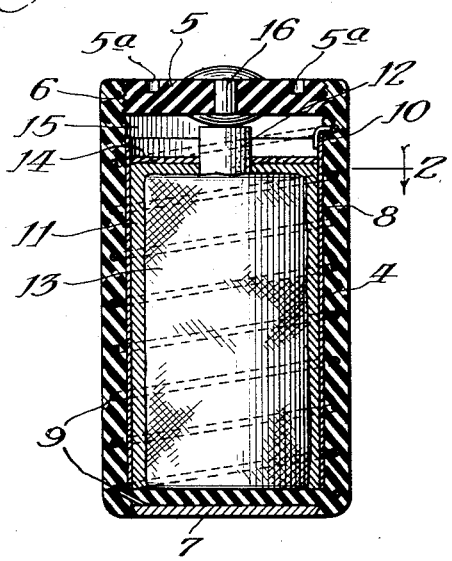
Figure 2:
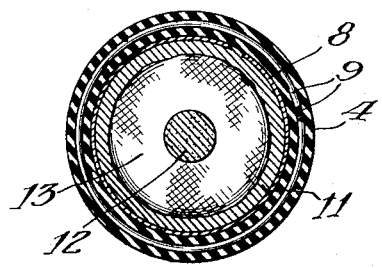
Figure 3:
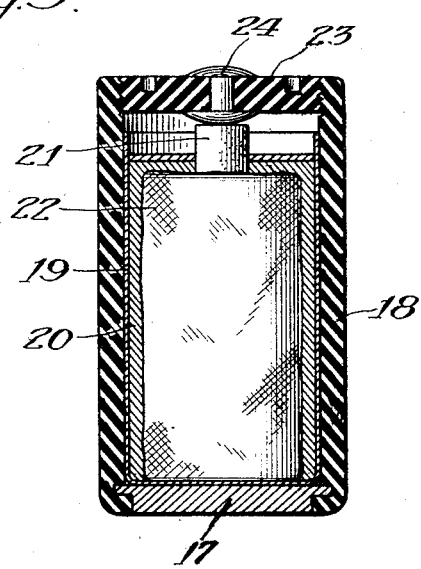

Figure 1 is a vertical sectional view of a cell embodying the invention; Figure 2 is a sectional view, taken as indicated at line 2 of Figure 1; and Figure 3 is a vertical sectional view of a modification.

In the embodiment illustrated in Figures 1 and 2 the cell has a cup-shaped body of insulating material 4 and a closure member 5 of similar material which may make a threaded connection with the inner wall of the cell as indicated at 6. A metal disk 7 is embedded in the bottom of the cell as it is formed. This disk forms an electric terminal for the cell and preferably makes a connection with the metal electrode 8 within the cell by means of a spiral-shaped lead wire 9 which is embedded in the cylinder wall so as to reinforce the same and strengthen it against lateral distortion.

The metal electrode 8 is preferably made of a sheet of zinc which may be in the form of a sleeve or a ring of sheet zinc that will slip into the cup 4. After it is in position the lead wire 9 may be soldered thereto, as indicated at 10. The cell contains the usual electrolyte 11 in which a carbon electrode 12, provided with a depolarizing mix 13, rests. A paper washer 14 is shown at the top of the electrolyte and leaves an air space 15 at the top of the cell.

A closure member 5 is shown provided with a headed terminal 16 whose inner end is in electrical contact with the carbon pole and whose outer end is exposed. Preferably, the threads on the closure member are coated with a cementitious material before the closure is screwed down into position by means of a spanner wrench engaging sockets 5a in the closure member.

The dry cell thus formed is capable of withstanding great internal pressure which develops as a result of gas generated while the cell is being discharged. Some of the plastic materials will bend under such conditions, but the lead wire 9 serves the double purpose of conducting electrical current and reinforcing the wall. The finished cell is of attractive appearance and is capable of withstanding ordinary rough handling without breakage.

In the embodiment illustrated in Figure 3, a modified construction is shown. In this form of the invention a metal disk 17 is molded into plastic wall 18 but the inner face of the disk 17 is not insulated from the metal electrode. In this form of device the zinc electrode 19 is cup-shaped and contains electrolyte 20 and carbon electrode 21 with its depolarizing mix 22. The bottom of the zinc electrode rests on the metal disk 17 and makes electrical contact therewith without a lead wire. The closure member 23 with its terminal 24 is applied as explained above.

The foregoing detailed description has been given for clearness of understanding only, and no unnecessary limitations should be understood therefrom, for some modifications will be obvious to those skilled in the art.

I claim:

1. A leak-proof cell provided with circuit terminals at opposite ends, comprising: a cylindrical wall of moisture-proof resinous plastic material, said wall being closed at its lower end and having an exposed metal base plate whose edge portions are permanently embedded in said plastic material; a zinc electrode enclosed by the wall and electrically connected to said plate; a centrally disposed carbon electrode in the cell; and a top closure member having an exposed central metal terminal and making electrical contact with said carbon electrode.

2. A leak-proof cell having a casing of moisture-proof insulating material and provided with circuit terminals at opposite ends, comprising: a cup-shaped shell of resinous plastic material; an exposed metal disk in the bottom of said cell; a metal electrode within said cup and having its upper end connected to said metal disk by means of a reinforcing wire molded in the wall of said cup; a centrally disposed carbon electrode in said cup; and a closure member of resinous plastic material threaded into the top of said cup and having a centrally disposed terminal member extending therethrough and making electrical contact with said carbon electrode.

3. A leak-proof cell as specified in claim 2, in which the reinforcing wire which is molded in the wall of the cup is in the form of a coil making a plurality of axial turns.

4. A leak-proof cell provided with circuit terminals at opposite ends, comprising: a cylindrical wall of resinous plastic material, said wall having at its lower end a metal plate secured to said plastic material and serving as a base terminal; a zinc electrode concealed within said cylindrical wall and having an electrical connection with said metal plate; a centrally disposed upwardly extending carbon electrode in said zinc electrode; electrolyte in said zinc electrode; and a top closure member of resinous plastic material threaded into the upper end of the plastic cylinder wall, said closure having an outwardly exposed centrally located metal terminal fixed therein and making electrical contact with the carbon electrode.

WILLIAM W. CARGILL.